United States Patent

Kuwahara

[15] 3,700,058
[45] Oct. 24, 1972

[54] MOTORIZED AMUSEMENT CAR

[72] Inventor: Ayako Kuwahara, Tokyo, Japan

[73] Assignee: Agency of Industrial Science & Technology, Tokyo, Japan

[22] Filed: Dec. 8, 1969

[21] Appl. No.: 882,994

[52] U.S. Cl. .................................................. 180/21
[51] Int. Cl. ............................................. B62d 61/00
[58] Field of Search ................. 180/2, 21; 104/59, 53

[56] References Cited

UNITED STATES PATENTS

| | | | |
|---|---|---|---|
| 1,467,959 | 9/1923 | Stoehrer et al. | 180/2 |
| 1,534,978 | 4/1925 | DeWaltoff et al. | 180/2 |
| 1,669,104 | 5/1928 | Stock | 180/2 |

FOREIGN PATENTS OR APPLICATIONS

| | | | |
|---|---|---|---|
| 647,365 | 10/1962 | Italy | 180/2 |

*Primary Examiner*—A. Harry Levy
*Attorney*—Ernest G. Montague

[57] ABSTRACT

A motorized amusement car comprising a car body, a steerable driving wheel provided on the car body to be steered, a group of three or more caster wheels positioned near the outer edge of the car body and surrounding the driving wheel and a substantially annular seat surrounding the steering mechanism of the driving wheel, the driving wheel extending below the imaginary plane including all of the caster wheels, i.e., the plane upon which the caster wheels would rest if there were no driving wheel, so that the motorcar is not only capable of being driven in any desired direction by manually operating the steering mechanism but is also capable of changing its direction of movement in response to changes in the manner in which the weight of the person riding thereon is distributed.

2 Claims, 3 Drawing Figures

PATENTED OCT 24 1972 3,700,058
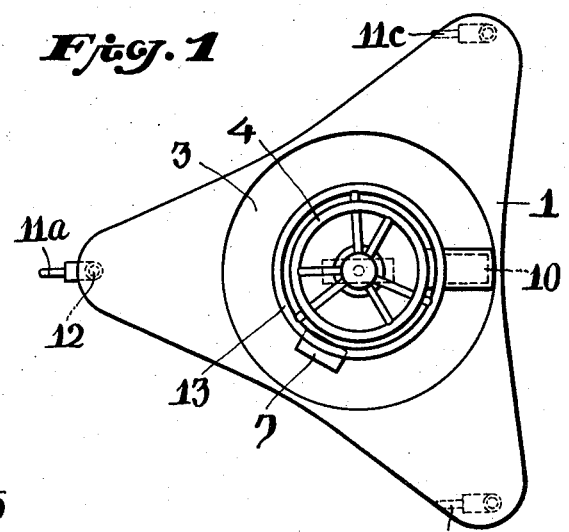
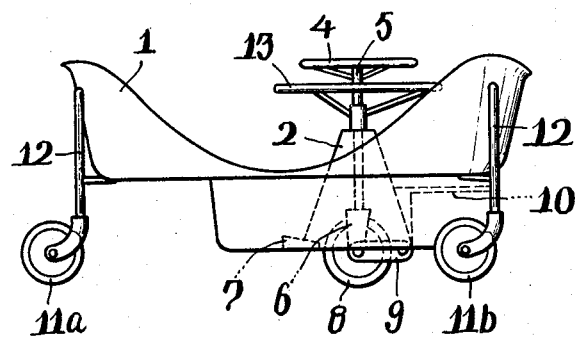
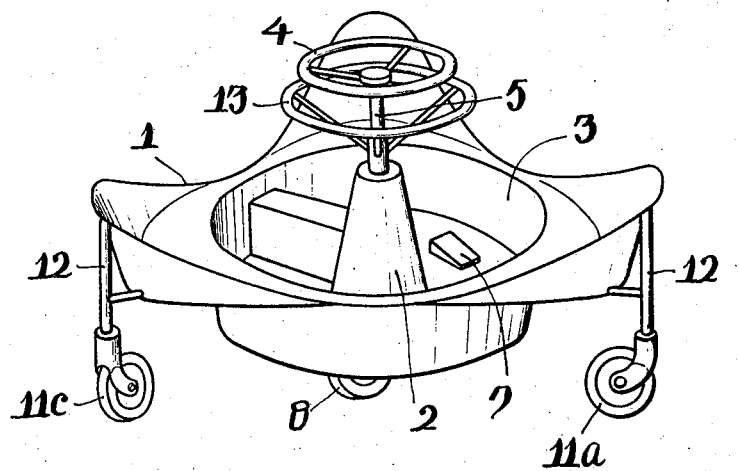
INVENTOR.
Ayako Kuwalara
BY
attorney

MOTORIZED AMUSEMENT CAR

The present invention relates to a motorized amusement car.

Heretofore there has been known a motorized amusement car which can be driven in any desired direction by manually operating a steering mechanism.

An object of the present invention is to provide a motorized amusement car which is not only capable of being driven in any desired direction by manually operating the steering mechanism thereof but is also capable of changing its direction of movement in response to changes in the manner in which the weight of the person riding thereon is distributed. Therefore, when the present motorcar is used by children at a playground or the like, it not only amuses them but also helps to develop their motor nerves.

Other objects and features of the present invention will become apparent from the following explanation of the present invention in connection with the attached drawings, in which:

FIG. 1 is a plan view of an embodiment of the present motorized amusement car.

FIG. 2 is a side view of the embodiment shown in FIG. 1, and

FIG. 3 is an oblique view of the embodiment shown in FIG. 1.

In the drawings, the shape of car body 1 is substantially an equilateral triangle in plan view. A circular recess is provided in the central portion of an annular seat 3 and a steering post 2 extends from the bottom of the recess.

The car body 1 may be made of hardened plastic or formed metal sheet. Although the shape of car body 1 is a triangle, this shape is employed for mere appearance since, as will be explained in detail hereinafter, three caster wheels are used at three points corresponding to the points of the triangle and consequently the shape of the car body may be circular or, if more caster wheels are used, square, pentagonal or hexagonal, etc.

A steering shaft 5 having, steering wheel 4 mounted at the upper end thereof is inserted into the post 2 axially and a driving wheel 8 is provided at the lower end of the shaft via an adapter 6.

In order to drive the driving wheel 8, an electric motor 9 is provided beneath the lower end of steering shaft 5, the rotation of the motor being stepped down and transmitted to the driving wheel 8. A power source such as a battery 10 for operating the motor is mounted at a suitable position on the car body 1; a power switch acting as an accelerator pedal 7 is provided in the electric circuit which supplies electric current from the battery 10 to the motor 9, and a slip-ring type current collector is provided in the circuit in order to permit the motor to be operated even when the driving wheel 8 is steered by the steering mechanism comprising the steering wheel 4 and the steering shaft 5.

The steering mechanism may be rotated freely beyond 360° or restricted to within a fixed angle narrower than 360°. The car body 1 is further provided with three caster wheels 11a, 11b and 11c positioned in such a manner that they surround the driving wheel 8. In the illustrated embodiment, these caster wheels are secured pivotably to supports 12 extending downwardly from the lower surface of the points of the triangular car body 1.

An important feature is that the driving wheel 8 is positioned in such a way that it protrudes below the imaginary plane formed by the bottom-most points of the three caster wheels, i.e., the plane upon which the caster wheels would rest if no driving wheel were provided.

Thus, if the diameter of the driving wheel 8 and that of the caster wheels are equal, the axle of the driving wheel is positioned lower than the axles of the caster wheels, and if the axle of the driving wheel and those of the caster wheels are on the same level, the diameter of driving wheel 8 is made larger than that of the caster wheels so that in either case, the bottom of the driving wheel 8 is positioned below the imaginary plane determined by the bottom-most points of the three caster wheels.

Thus, when the car body is put on a floor, the driving wheel 8 and only some (one or two) of the caster wheels contact with the floor and the remainder of the caster wheels remain above the floor, so that car body 1 is maintained at an inclined attitude with respect to the floor. The larger the angle of inclination of the car body to the floor, the larger the danger of overturning, and consequently a relatively small angle should be selected.

When the car body 1 is supported on the floor by its driving wheel 8 and two of its caster wheels and driving wheel 8 is driven, the direction of travel of the caster wheels becomes parallel to the direction of travel of the driving wheel which is controlled by the steering wheel 4, and if the steering wheel 4 is turned in such a manner that the locus of the driving wheel becomes a small circle, the car body 1 turns just as if it pivots on driving wheel 8. In this condition, if the person riding on the car shifts his weight so that the free caster wheel contacts the floor and one of the caster wheels in contact with the floor rises off the floor, the direction of motion of the car is modified. Further, in the operation of the car, if the weight of the person is shifted to a position above one of the caster wheels contacting the floor so as to cause the other caster wheel in contact with the floor to rise, the car is then supported on the floor by its driving wheel 8 and only one of its caster wheels and it turns about the caster wheel in contact with the floor.

Accordingly, by changing the distribution of weight of the person riding in seat 3, the direction of travel is modified unexpectedly and the direction of travel is further changed by turning the steering wheel.

The number of persons who sit on the seat 3 may, of course, be more than one. Thus a number of individuals can shift their weights freely so that all of the riders may enjoy the very complicated car movement.

In the case where several members ride on the car, a grip wheel 13 is provided on the steering post 2. The grip wheel 13 is desirably rotatable around the post so that riders other than the rider who steers can grip the grip wheel 13 to support themselves and feel that they are participating in steering the car.

Although the present invention is described in accordance with the embodiment illustrated in the drawings as above, it should be noted that the number of caster wheels which are desposed in such a manner that they surround the driving wheel 8 is not limited to three, that a safety belt or belts can be provided to seat 3 to permit the riders to be loosely secured to the seat while permitting relatively free shifting of their load points, but preventing them from falling from the seat in the event of a collision or abrupt and unexpected movement of the car, and that a bumper and/or a braking mechanism for braking the driving wheel, which may be controlled from the seat, can be provided. It should be recognized that these and other modifications are within the scope of the present invention.

I claim:

1. A motorized amusement car for being driven on a ground surface, comprising a car body substantially triangular in shape, a driving wheel means operatively mounted to said car body and substantially in the center of said triangular shape of said car body for driving the latter, means mounting said driving wheel means for rotation about a vertical axis to thereby impart steering motion to said vehicle, said driving wheel means being steerable, motor means in said car for powering said driving wheel means, means for steering said driving wheel about said axis, means mounting three caster wheels to said body for free pivotal and rotatable movement, each of said caster wheels disposed adjacent each apex of said triangular shape of said car body, a seat substantially annular in shape surrounding said steering means, the lowermost portions of said caster wheels defining an imaginary plane, the lowermost portion of said driving wheel extending lower than said imaginary plane and contacting said ground surface simultaneously with no more than two of said caster wheels, changeably, and means disposed adjacent to said seat for selective actuation of said power means to drive said driving wheel means.

2. The amusement car, as set forth in claim 1, wherein said last mentioned means is a pedal means.

* * * * *